Figure 1:
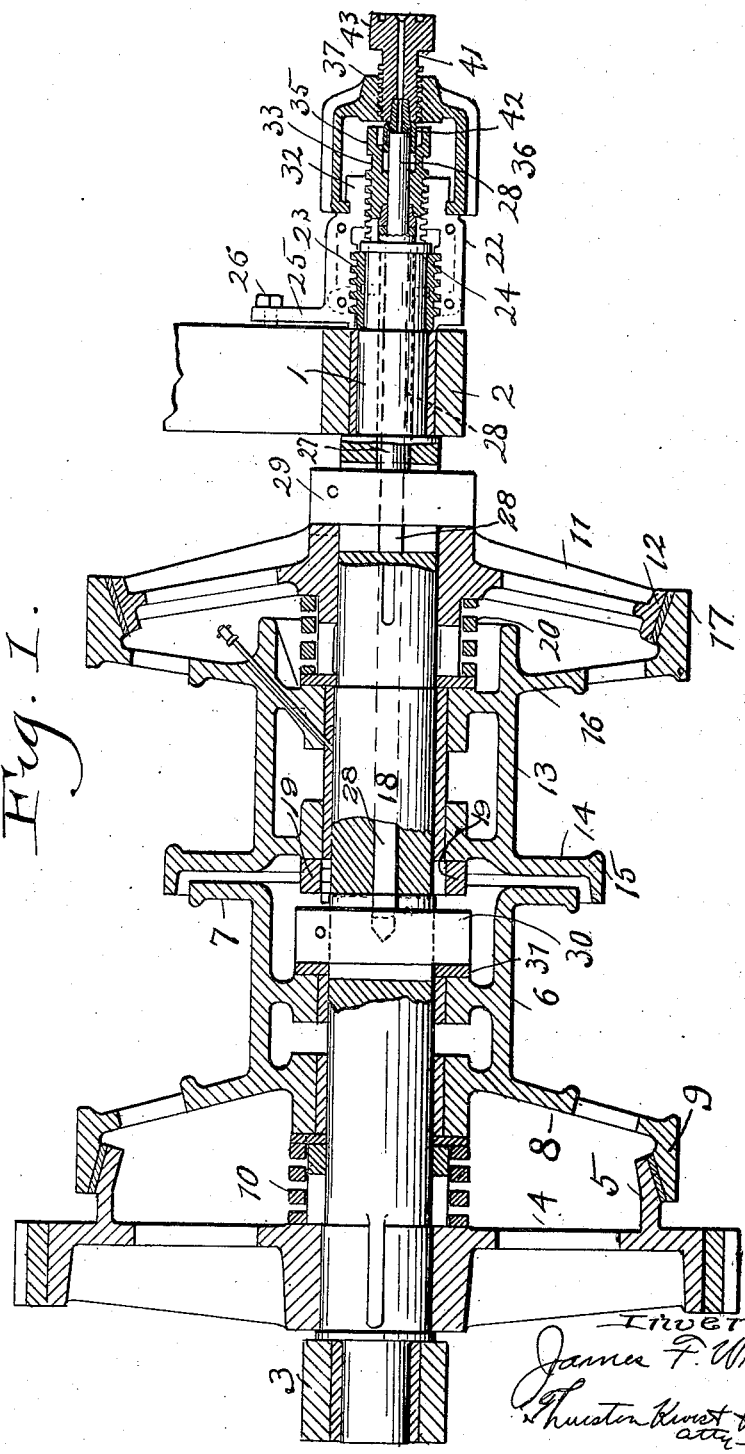

June 7, 1927.

J. F. WRIGHT 1,631,392

CLUTCH OPERATING MECHANISM

Filed Dec. 9, 1922

2 Sheets-Sheet 1

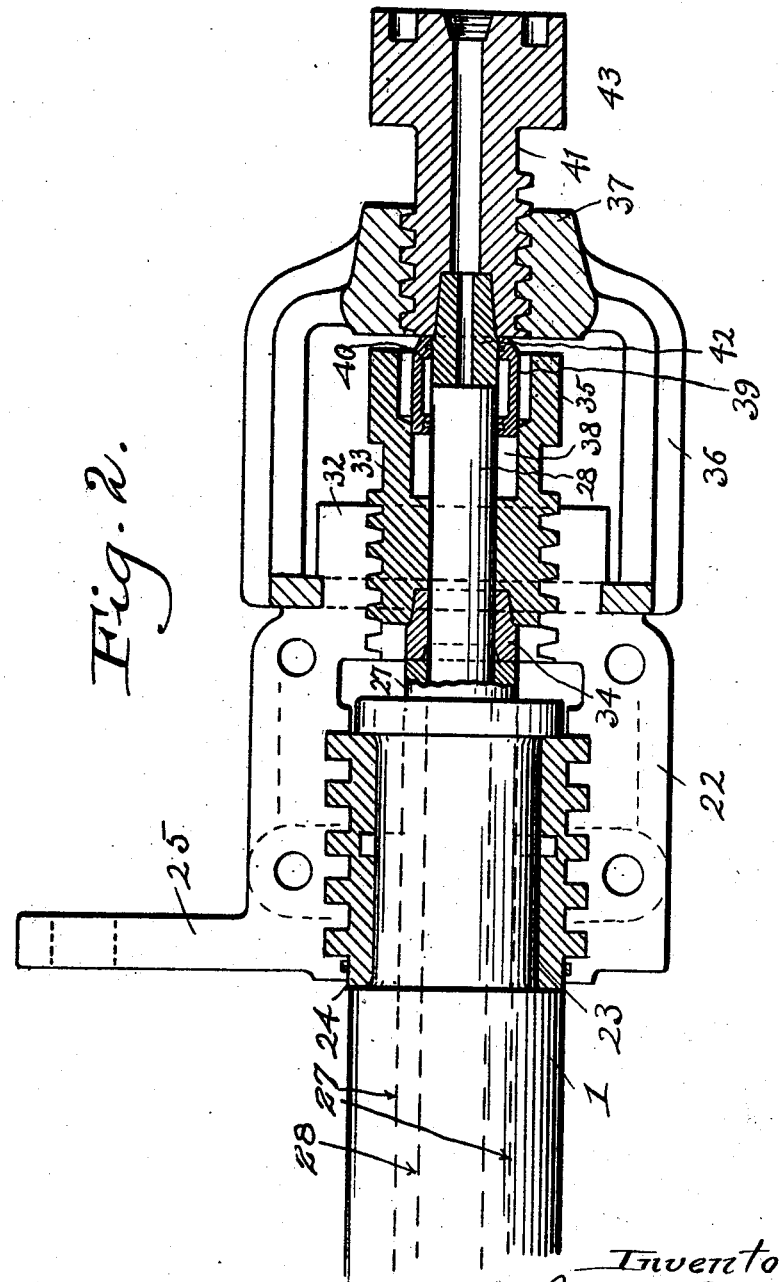

Patented June 7, 1927.

UNITED STATES PATENT OFFICE.

1,631,392

JAMES F. WRIGHT, OF CLEVELAND, OHIO, ASSIGNOR TO THE McMYLER INTERSTATE COMPANY, OF BEDFORD, OHIO, A CORPORATION OF OHIO.

CLUTCH-OPERATING MECHANISM.

Application filed December 9, 1922. Serial No. 605,830.

This invention relates to mechanism for selectively operating a plurality of clutches upon the same shaft, as shown herein, the device being applied to the friction clutches controlling the hoist and hold drums of a crane.

An object of the invention is to provide a clutch operating mechanism in which the clutch shifting members are mounted within the shaft and the operating members for the clutches are located at an end of the shaft convenient to the operator.

A further object is to enable the drums of the hoist to be controlled by cone clutches instead of by one cone clutch and an outside band clutch as has heretofore been the practice.

Other objects will be apparent from the following description and accompanying drawings.

The following description and accompanying drawings set forth in detail certain means embodying my invention, the disclosed means, however, constituting but one of the various mechanical forms in which the principle of the invention may be employed.

Reference should be had to the accompanying drawings forming a part of this specification in which Fig. 1 is a longitudinal section through the hoist drums, clutches and clutch operating screws; Fig. 2 is an enlarged longitudinal section through the clutch shifting screws at the end of the shaft.

Referring to the accompanying drawings, the drum shaft 1 is hollow and has reduced ends journaled in fixed supports 2 and 3, the shaft having shoulders at the inner sides of the fixed supports by means of which the shaft is held against longitudinal movement. Adjacent the fixed support 3, a gear 4 is fixed to the shaft 1 and has projecting from its inner face a flange 5, the outer surface of which is conical. To the inner side of the fixed gear 4, a drum 6 having inner and outer peripheral flanges 7 and 8 is loosely mounted on the shaft. The peripheral flange 8 of the drum 6 has an outturned clutch portion 9 which has a conical inner face adapted to engage the outer surface of the clutch flange 5 on the gear 4. A coil spring 10 is interposed between the gear 4 and the drum 6 and serves to normally hold the drum 6 away from the gear 4 so that the clutch members 5 and 9 are out of engagement. Just within the opposite fixed support 2 a clutch member 11 having a peripheral rim 12 with a conical outer face is slidably keyed to the shaft 1. To the inner side of the clutch member 11 is a drum 13 which is loose upon the shaft and has an inner flange 14, the outer portion 15 of which is turned outwardly to overlie the flange 7 of the drum 6. The drum 13 has an outer flange 16, the outer portion 17 of which extends outwardly and has a conical inner surface adapted to be engaged by the rim portion 12 of the clutch member 11. The drum 13 is mounted upon a reduced portion 18 of the shaft and bears at its inner end against a washer 19 which fits against the shoulder at the end of the reduced portion 18. A coil spring 20 is interposed between the drum 13 and slidable clutch member 11 and serves to normally hold the clutch member 11 out of engagement with the drum. The shaft 1 projects at one end past the fixed support 2 and supports a two part bracket 22 which is clamped over and turns upon a bronze bushing 23 which fits within a groove 24 at the end of the shaft and is pinned to the shaft. The bracket 22 has a laterally extending arm 25 which is engaged by a pin 26 carried by the fixed support 2 to hold the bracket against rotation.

Within the hollow shaft 1 and having slidable fit therein is a hollow push pin 27, the outer end of which projects slightly beyond the end of the shaft 1 to which the bracket 22 is attached. Slidably fitting within the hollow push pin 27 is a solid push pin 28 the outer end of which projects beyond the outer end of the push pin 27.

Fixed to the inner end of the hollow push pin 27 is a key 29 which extends through slots in the shaft 1 engaging outside the shaft against the hub of clutch member 11.

Fixed to the inner end of the push pin 28 is a key 30 which extends through slots in the shaft 1 and engages a washer 31 at the inner end of the hub of the drum 6. The bracket 22 has a portion 32 extending beyond the end of the shaft 1, the portion 32 of the bracket having an internally threaded opening in axial alignment with the shaft. A hollow screw 33 which is bored axially to receive the push pin 28 is fitted in the threaded opening of the bracket and has a bronze bearing tip 34 at its inner end engaging the outer end of the hollow push pin 27. The screw 33 has a head portion 35 adapted to be engaged by a suitable operating tool, whereby the screw may be turned to force the push pin 27 inwardly or to release the push pin 27 and permit it to be moved outwardly by the coil spring 20. A spider 36 is rigidly secured to the end 32 of the bracket and has an outer end portion 37 with an internally threaded opening therethrough which is also in axial alignment with the shaft. The end portion 37 of the spider is beyond the head 35 of the screw 33 and is spaced sufficiently from the end 32 of the bracket to permit the necessary movements of the screw 33. The head 35 of the screw 33 has two counter-bores 38 and 39, the inner of which, 38, receiving an oil reservoir 40 fixed to the bronze tip 42, and the outer counter-bore 39 being of larger diameter to receive the inner end of the screw 41 for operating the push pin 28. The screw 41 is provided with a bronze tip 42 which engages the end of the push pin 28 and an enlarged head 43 adapted to be engaged by a suitable turning tool. When the screw 41 is turned in a direction to force the push pin 28 inwardly, the drum 6 is shifted into clutching engagement with the gear 4 in opposition to the coil spring 10. When the screw 41 is turned in the opposite direction, the screw is moved away from the end of the push pin 28, permitting the coil spring 10 to slide the drum 6 away from the gear 4, disengaging the clutch members. The screws 33 and 41 are operable independently so that either or both of the drums may be clutched to the shaft.

Having described my invention, I claim:

1. In a clutch controlled mechanism the combination with a hollow rotatable shaft, of clutch members slidable on the shaft, a hollow push pin within the shaft for shifting one of the clutch members, a push pin within the hollow push pin for shifting another clutch member, and means at one end of the shaft for operating said push pins.

2. In a clutch controlled mechanism, the combination with a hollow rotatable shaft, of clutch members slidable upon the shaft, a hollow push pin slidably mounted within the shaft, said push pin having a key projecting through a slot in the shaft and engaging a clutch member, a second push pin slidably mounted within the hollow push pin and having a key projecting through a slot in the shaft and engaging another clutch member, and means at one end of said shaft for shifting said push pins.

3. In a clutch controlled mechanism, a hollow rotatable shaft, a hollow longitudinally movable push pin within the hollow shaft, said push pin having a key extending through a slot in said shaft, a second longitudinally movable push pin within said hollow push pin and having a key projecting through a slot in the shaft, clutch members slidable upon said shaft, springs for normally holding said slidable clutch members in inoperative position and in engagement with said keys, and means at one end of the shaft for selectively operating said push pins to shift the clutch members in opposition to said springs.

4. In a clutch controlled mechanism, the combination with a hollow rotatable shaft having a plurality of shiftable clutch members thereon, of means for selectively operating said clutch members comprising a hollow push pin, a push pin within the hollow push pin, said push pins having parts engaging said clutch members, a nonrotatable bracket supported upon the end of said shaft, and screws carried by the bracket engaging the ends of said push pins.

5. In a clutch controlled mechanism, the combination with a hollow rotatable shaft having a plurality of shiftable clutch members thereon, of means for selectively operating said clutch members comprising a hollow push pin within the shaft and a second push pin within said hollow push pin, said push pins having parts at their inner ends engaging the clutch members, the outer ends of the push pins projecting beyond an end of the shaft, a non-rotatable bracket supported on said end of the shaft, said bracket having a part at the end of the shaft provided with a threaded opening in axial alignment with the shaft, a hollow screw in said threaded opening surrounding the inner push pin and engaging the hollow push pin, an extension carried by the bracket, said extension having a threaded opening in axial alignment with the inner push pin, and a screw in said last mentioned opening engaging the end of said inner push pin.

6. The combination with a shaft, of a pair of inner members loose on the shaft, outer clutch members keyed to the shaft, one of said outer clutch members being slidable on the shaft into engagement with one of said inner clutch members, the other inner clutch member being slidable upon the shaft into engagement with the other outer clutch member, springs interposed between said fixed and movable clutch members for normally holding them out of engagement, a hollow push pin having a part engaging one of said slidable clutch members, a push pin within the outer push pin having a part engaging the other slidable clutch member, and means at one end of said shaft for selectively operating said push pins to move either slidable clutch member in opposition to its spring into engagement with the clutch member cooperating therewith.

In testimony whereof, I hereunto affix my signature.

JAMES F. WRIGHT.